(12) United States Patent  
Letzelter et al.

(10) Patent No.: US 9,772,770 B2  
(45) Date of Patent: Sep. 26, 2017

(54) COMPUTER-IMPLEMENTED METHOD FOR CONFIGURING A TOOL WITH AT LEAST ONE POINTING ELEMENT ON A SCREEN

(71) Applicant: Dassault Systemes, Velizy Villacoublay (FR)

(72) Inventors: Frederic Letzelter, Longjumeau (FR); Mathieu Gunther, Le Chesnay (FR)

(73) Assignee: Dassault Systemes, Vilizy Villacoublay (FR)

( * ) Notice: Subject to any disclaimer, the term of this patent is extended or adjusted under 35 U.S.C. 154(b) by 273 days.

(21) Appl. No.: 14/562,553

(22) Filed: Dec. 5, 2014

(65) Prior Publication Data

US 2015/0177854 A1    Jun. 25, 2015

(30) Foreign Application Priority Data

Dec. 20, 2013    (EP) ..................................... 13306824

(51) Int. Cl.
| | |
|---|---|
| *G06F 13/00* | (2006.01) |
| *G06F 15/00* | (2006.01) |
| *G06F 3/0488* | (2013.01) |
| *G06F 3/0484* | (2013.01) |

(52) U.S. Cl.
CPC ...... *G06F 3/04883* (2013.01); *G06F 3/04847* (2013.01)

(58) Field of Classification Search
CPC ...................................................... G06F 3/0487

USPC ......................... 715/761–765, 841, 851–853
See application file for complete search history.

(56) References Cited

U.S. PATENT DOCUMENTS

| 5,280,275 A * | 1/1994 | Kaplan ............... G06F 3/04847 |
| | | 345/157 |
| 2008/0226199 A1 | 9/2008 | Breglio |
| 2008/0273017 A1 | 11/2008 | Woolley et al. |

FOREIGN PATENT DOCUMENTS

| EP | 0342838 A2 | 11/1989 | |
| EP | 0342838 | * 12/1989 | ........... G06F 3/0487 |
| EP | 2083350 A2 | 7/2009 | |

OTHER PUBLICATIONS

European Search Report for Application No. 13306824.7 dated May 12, 2014.

* cited by examiner

*Primary Examiner* — Kevin Nguyen  
(74) *Attorney, Agent, or Firm* — Hamilton, Brook, Smith & Reynolds, P.C.

(57) ABSTRACT

A computer-implemented method for configuring a tool with at least one pointing element on a screen comprising the steps of: pointing and activating (S1) a tool with a pointing element, said tool comprising a list of customizable parameters; and without releasing the pointing element, providing (S2) a first direction for selecting a customizable parameter of the list; providing (S3) a second direction for customizing a selected parameter of the list; and defining (S4) series of moves of the pointing element according to first and second direction for configuring the tool.

22 Claims, 6 Drawing Sheets

COMPUTER-IMPLEMENTED METHOD FOR CONFIGURING A TOOL WITH AT LEAST ONE POINTING ELEMENT ON A SCREEN

RELATED APPLICATION

This application claims priority under 35 U.S.C. §119 or 365 to European Application No. 13306824.7, filed Dec. 20, 2013.

The entire teachings of the above application(s) are incorporated herein by reference.

TECHNICAL FIELD

The invention relates to the field of computers programs and systems, and more specifically to the field of computer-implemented method for configuring a tool with at least one pointing element on a screen.

The present invention can belong to any field of technology using configurable tools.

The invention can belong to any field of technology using (virtual) buttons to activate tools. For example, the present invention can be included in CAD products.

BACKGROUND OF THE INVENTION

Most of software comprise a set of tools. For example, drawing software have different virtual pencils (pens, pencils, brushes, primitive objects, paint . . . ), CAD software have some authoring tools (primitive creation, transformation, extrusion . . . ). All these tools have default parameters that the user is able to modify as color or size of a pencil, depth of an extrusion, type of primitive . . . .

Often, these customizable parameters can be accessed thanks to a separated panel containing buttons and sliders, or thanks to a contextual menu that appears at click or hold action on the screen, or thanks to a contextual menu that appears after an action on the button.

In the following the term click can be considered as a mouse click or a hold action on the screen with another pointing element, as a pen or a finger. A hold action can be a quick hold equivalent to a mouse click.

The background art have some drawbacks, as the number of clicks to launch a tool and customize the parameters, as illustrated in the following table:

| Nb Parameters | 1 | 5 | 10 |
|---|---|---|---|
| Separated Panel | 4 clicks | 9 clicks | 14 clicks |
| Contextual menu on screen | 4 clicks | 9 clicks | 14 clicks |
| Contextual menu on button | 3 clicks | 8 clicks | 13 clicks |

The cases "separated panel" and "contextual menu on screen" need 1 click to launch the command, 1 click to access the parameters, 1 click by parameter and 1 click to respectively close the panel or menu. The case "contextual menu on button" needs 1 click to launch and access the parameters, 1 click by parameter and 1 click (often on the empty screen) to close the menu.

Then the space used on the screen increases with the number of parameters, thus the user needs to close the panel to access its creation space. Thus, the time necessary to launch a tool and perform all the adjustments of all the parameters.

SUMMARY OF THE INVENTION

A goal of the invention is to provide a computer-implemented method and a system to overcome the above mentioned problems.

Thus, it is proposed, according to an aspect of the invention, a computer-implemented method for configuring a tool with at least one pointing element on a screen comprising the steps of:

pointing and activating a tool with a pointing element, said tool comprising a list of customizable parameters;

without releasing the pointing element:

providing a first direction for selecting a customizable parameter of the list;

providing a second direction for customizing a selected parameter of the list; and defining series of moves of the pointing element according to first and second direction for configuring the tool.

Such a method allows the user to launch a tool and customize the corresponding parameters with only one click, i.e. without lifting the pointing element. The idea is to make a gesture on the button in order to, without lifting or releasing the pointing element: launching the tool, accessing the parameters/options, and modifying these parameters.

A pointing element is a mouse, or a pen or a finger in case of touchscreen.

According to an embodiment, said first and second directions are orthogonal, and for example said first direction is vertical and said second direction is horizontal, or conversely.

Using orthogonal directions, and for example vertical and horizontal directions, is easier for the user. Indeed, it is natural to move a slider horizontally, and, in addition, horizontal and vertical directions are "canonical" directions, thus the gesture is easy to learn and master (as opposed to a smaller angle between the two directions which can cause more handling errors).

According to an embodiment, said pointing element is a mouse, a pen, or a finger.

The screen can be a touch screen or a multi-touch screen.

According to an embodiment, said parameter can be thickness, opacity, hardness, or intensity of a color.

Said parameter can be a parameter with a continue intensity value, or, alternatively a parameter is a parameter with a discrete intensity value.

According to an embodiment, the selection and customization of the parameter is displayed above the pointing element.

Thus, the visibility and use is improved. It is possible to manipulate the parameter without finger on it: it is more accurate in the placement of the slider. In addition, as the manipulation is not in the scene, it is possible to see the effect of a parameter in real-time in the context.

The tool can be automatically activated at the end of configuring.

Thus the user can immediately use the tool after its configuration.

It is also proposed, according to another aspect of the invention, a computer-readable medium having computer-executable instructions to perform the method for configuring a tool with at least one pointing element on a screen as described above.

It is also proposed, according to another aspect of the invention, a computer program product, stored on a computer readable medium, for displaying a three-dimensional modeled assembly in a scene, comprising code means for causing the system to take the steps of the method for configuring a tool with at least one pointing element on a screen as described above.

It is also proposed, according to another aspect of the invention, an apparatus for designing a three-dimensional modeled object comprising means for implementing the steps of the method for configuring a tool with at least one pointing element on a screen as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein.

DETAILED DESCRIPTION OF THE INVENTION

A description of example embodiments of the invention follows.

The following explains in more details the functioning of the present invention.

The present invention allows to configure a tool with only one click (or hold equivalent to a click), whatever could be the number of parameter of the tool he customizes.

In all the following examples, the expression pointing element can represent all means adapted to manage a pointing on the screen, as a mouse, or, in case of touchscreen, also a pen, or a finger.

Figure 1:
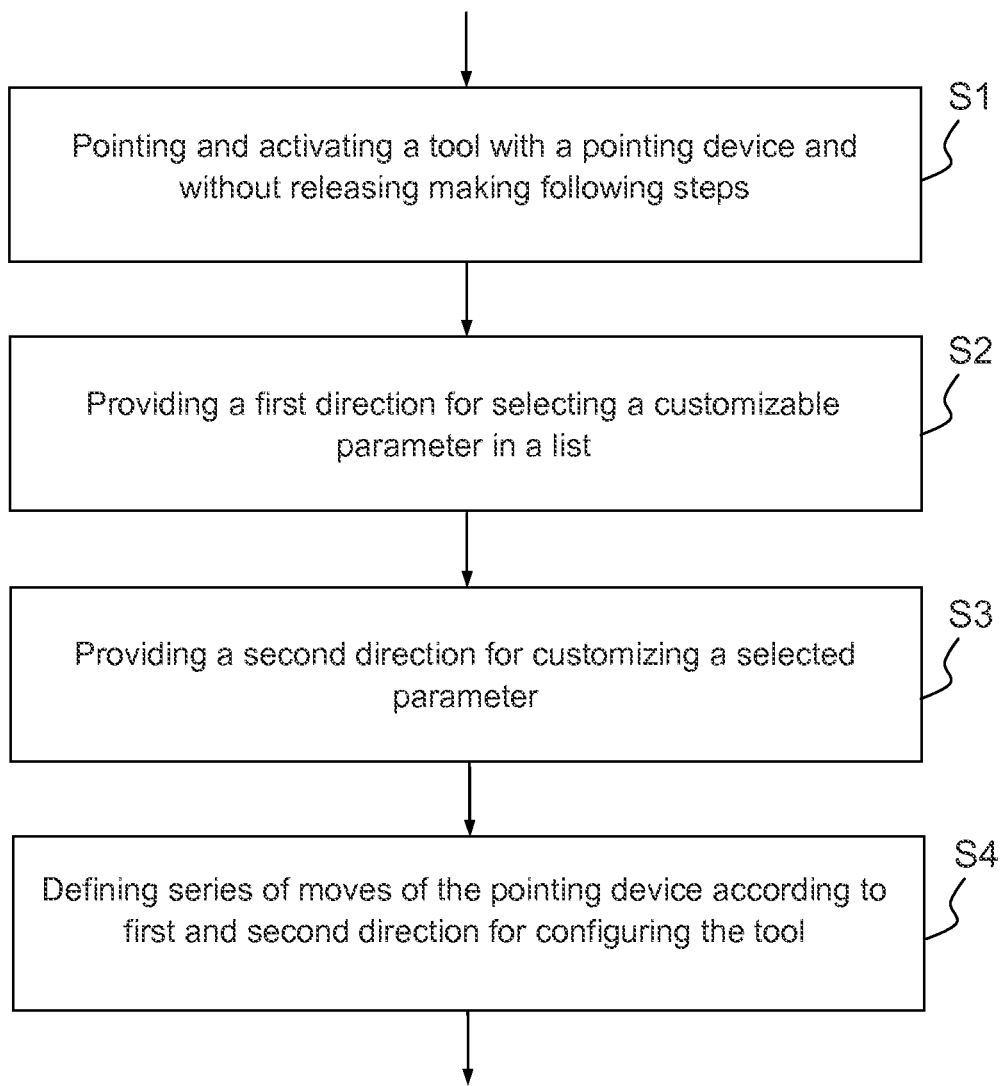
FIGS. 1 to 20 illustrate a method for configuring a tool with at least one pointing element on a screen according to an aspect of the invention.

The method comprises the following steps, as illustrated on FIG. 1:
pointing and activating S1 a tool with a pointing element, said tool comprising a list of customizable parameters; and
without releasing the pointing element:
providing S2 a first direction for selecting a customizable parameter of the list;
providing S3 a second direction for customizing a parameter of the list; and
defining S4 series of moves of the pointing element according to first and second direction for configuring the tool.

Figure 2:
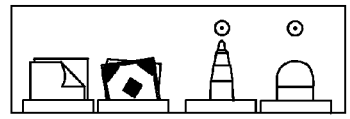

The first click or hold with the pointing element activates the concerned tool, as illustrated on FIG. 2, with the activation of the tool representing a pen.

In the described non limiting examples, the first direction is vertical (for selecting a customizable parameter of the list of customizable parameters of the tool) and the second direction is horizontal (for customizing a selected parameter of the list), because this is more intuitive and practical for the user.

Of course, many ways exist to allow that a drag of the pointing element that deviates of first and second directions to be still recognized as a drag along one of these directions, once the configuration of a tool has begun. For example, two straight lines can separate portions of plan wherein dragging of the pointing element are recognized as a corresponding of these two directions. Alternatively, a percentage difference of direction of dragging of the pointing element can be taken into account around the two directions. Furthermore, an indicator using differences of successive positions with these two directions during a drag can be taken into account.

The list of parameters for this tool can be, for example, for the line drawn by the pen tool, can comprise, for example, the following parameters: thickness, hardness, and opacity.

Figure 3:
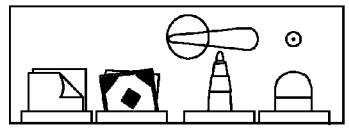
Figure 4:
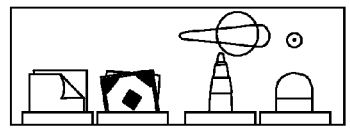

If the user drags the pointing element horizontally, it changes the first parameter of the list of parameters of the tool, which can be the most important, for example the thickness for the pen tool, as illustrated on FIGS. 3 and 4. On the present example, dragging the pointing element (represented by a hand) on the right increases the value of the parameter in customization, and dragging the pointing element on the left decreases the value of the parameter in customization.

Figure 5:
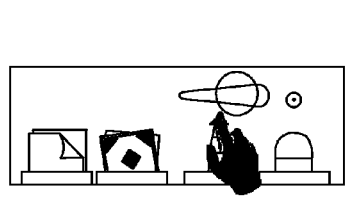
Figure 6:
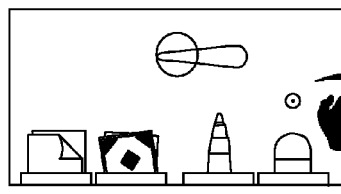
Figure 7:
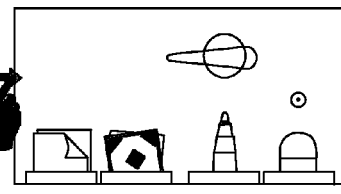

If the user drags up, as illustrated on FIGS. 5 and 6 the focus changes on a new parameter, the second of the list, and the user can adjust it by dragging horizontally the pointing element like for the first parameter, as illustrated on FIGS. 6 and 7.

Figure 8:
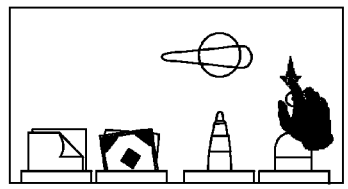
Figure 9:
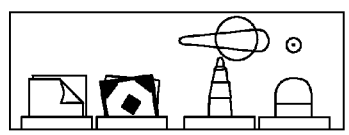

If the user drags down, the focus returns to the first parameter to customize, as illustrated on FIGS. 8 and 9.

Thus when the user drags up the pointing element, the focus changes on the next parameter of the list, and when he drags down the pointing element, the focus changes on the previous parameter of the list.

On FIGS. 10 to 19, to illustrate clearly a use of the present invention, is represented, above the screen with the displaying of the configuration of a tool, the corresponding trajectory of the pointing element, as a mouse on a surface or a finger or a pen on a touchscreen.

Figure 10:
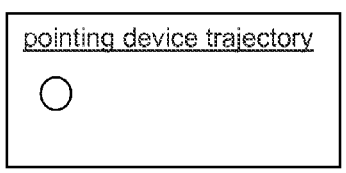

On FIG. 10, a circle represents the activation of the tool, by an initial press of the pointing element (a press of a button of the mouse, or a press or hold of the representation of the tool on the touchscreen).

Thus, by default, in the absence of a first vertical drag, the first parameter of the list of customizable parameters of the selected tool, which can be the main parameter of the tool, in this case the pen tool corresponding to the line drawing tool, is selected by default. In the present case, thickness of a line is considered as the main parameter of the pen tool.

Figure 11:
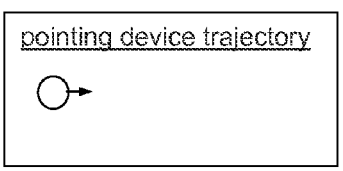
Figure 12:
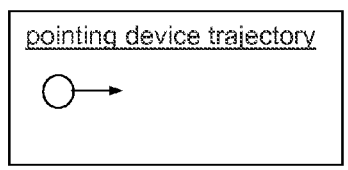

A first horizontal drag on the right, as represented on FIGS. 11 and 12, allows to increase the thickness of the line, until the thickness desired by the user is reached.

Figure 13:
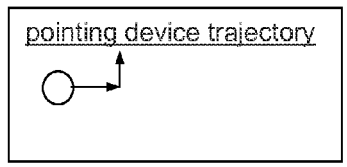
Figure 13:
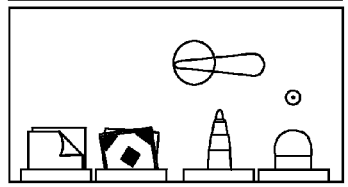
Figure 14:
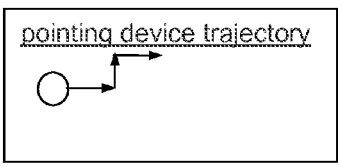
Figure 14:
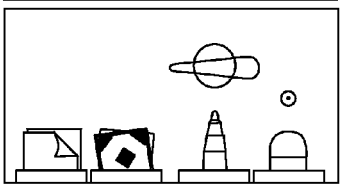

Thus, an up vertical drag, as represented on FIG. 13, allows to change the selection of the customizable parameter in the list of customizable parameters of the tool, in the present case, the second parameter of the list, which can be, in the present case, opacity of a line (the opposite of transparency). This second customizable parameter is then customized with an horizontal drag on the right, as illustrated on FIG. 14, to increase the opacity of a line.

Figure 15:
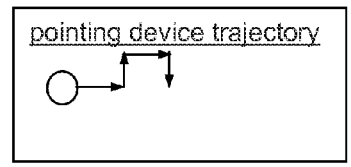
Figure 15:
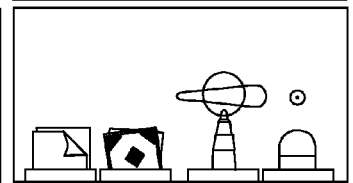

Thus, a down vertical drag, as represented on FIG. 15, allows to change the selection of the customizable parameter, in the present case coming back to the first parameter of the list (line thickness) to modify it.

Figure 16:
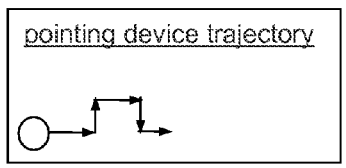
Figure 16:
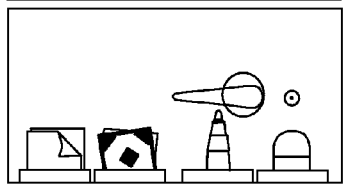

Thus an horizontal drag on the right, as illustrated on FIG. 16, to increase thickness of a line.

Figure 17:
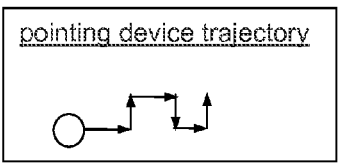
Figure 17:
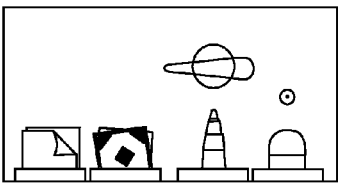
Figure 18:
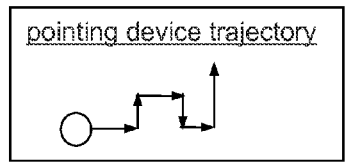
Figure 18:
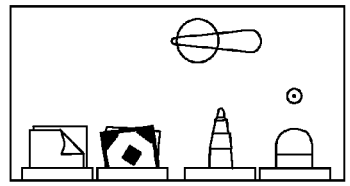

Thus, an up vertical drag, as represented on FIG. 17, allows to come back to the second customizable parameter of the list, and by continuing the up vertical drag, as represented on FIG. 18, to select the third parameter of the list, for example in the present case the hardness of the line. Hardness of a line represent the transition of opacity between the middle of line and the edge of line.

Figure 19:
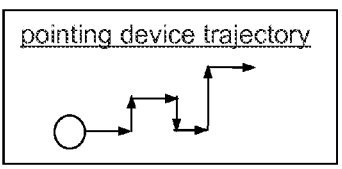
Figure 19:
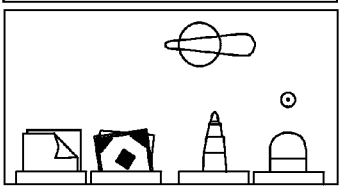

Thus, in the present case, as illustrated on FIG. 19, the third parameter of the list is increased by an horizontal drag on the right.

Figure 20:
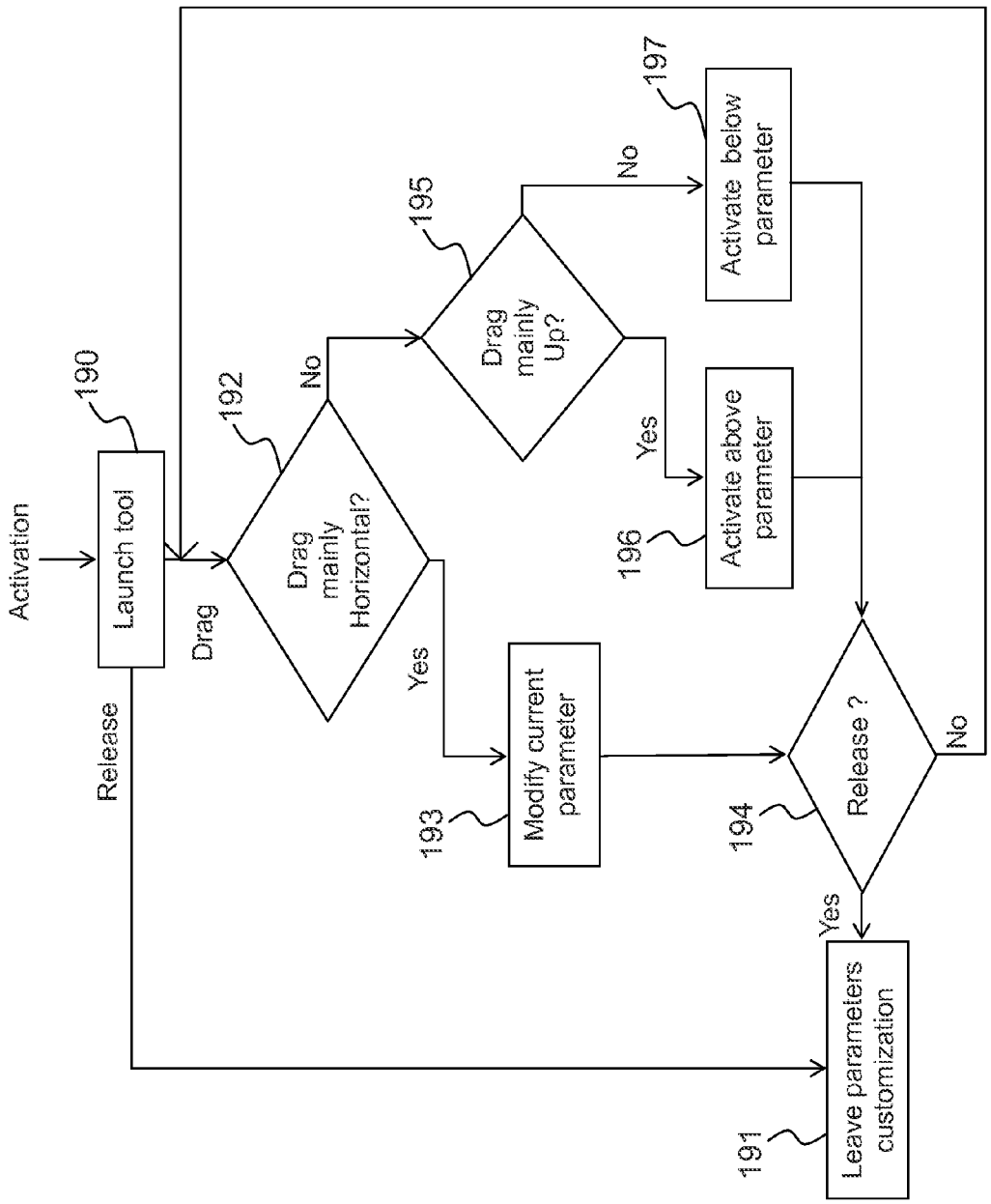

FIG. 20, schematically represents a method according to an aspect of the invention.

After an activation of the tool, by a press on a button of the mouse or a hold of the representation of the tool, the tool is launched or activated 190. If the button of the mouse is released without any dragging in any direction, or if the pen or finger stops the hold on the touchscreen, the user makes a release of the pointing element, thus the configuration of the tool is kept unchanged 191.

The configuration of the tool thus begins with the activation of the tool by a press on a button of the mouse or a hold of the representation of the tool with a finger or a pen, i.e. with any pointing element, and stops with the release of the pointing element, or, in other words at the end of the single gesture.

After the launching of the tool 190, if the user drags the pointing element, a test 192 is performed to check if the drag is mainly horizontal, and if the test 192 is positive, the first parameter of the list which is the main parameter, as in the present example the thickness of the line of the line tool, or the current parameter, is modified 193 according to the horizontal drag.

Then, a test 194 is effected for testing if the pointing element is released. If the test 194 is positive the configuration of the tool is left 191, and if the test 194 is negative the method returns to the test 192.

If the test 192 is negative, then a test 195 is made for testing if the drag is mainly up, and if the test 195 is positive, the method activates the above 196 parameter in the list, and if the test 195 is negative, the method activates 197 the below parameter in the list. After the corresponding activation 196 or 197, the method returns to the test 194.

Figure 21:
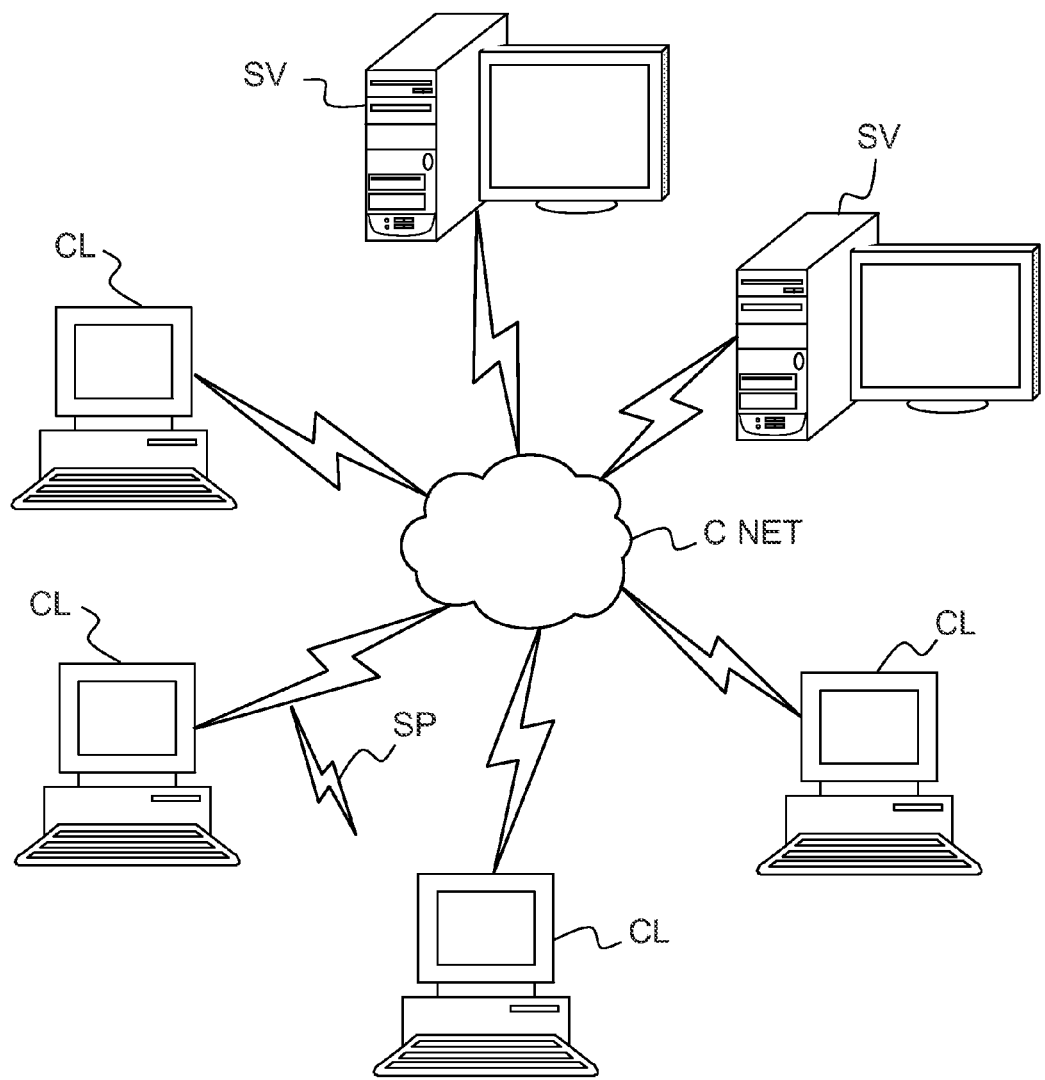
FIG. 21 illustrates a computer network or similar digital processing environment in which the present invention may be implemented.

FIG. 21 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 22:
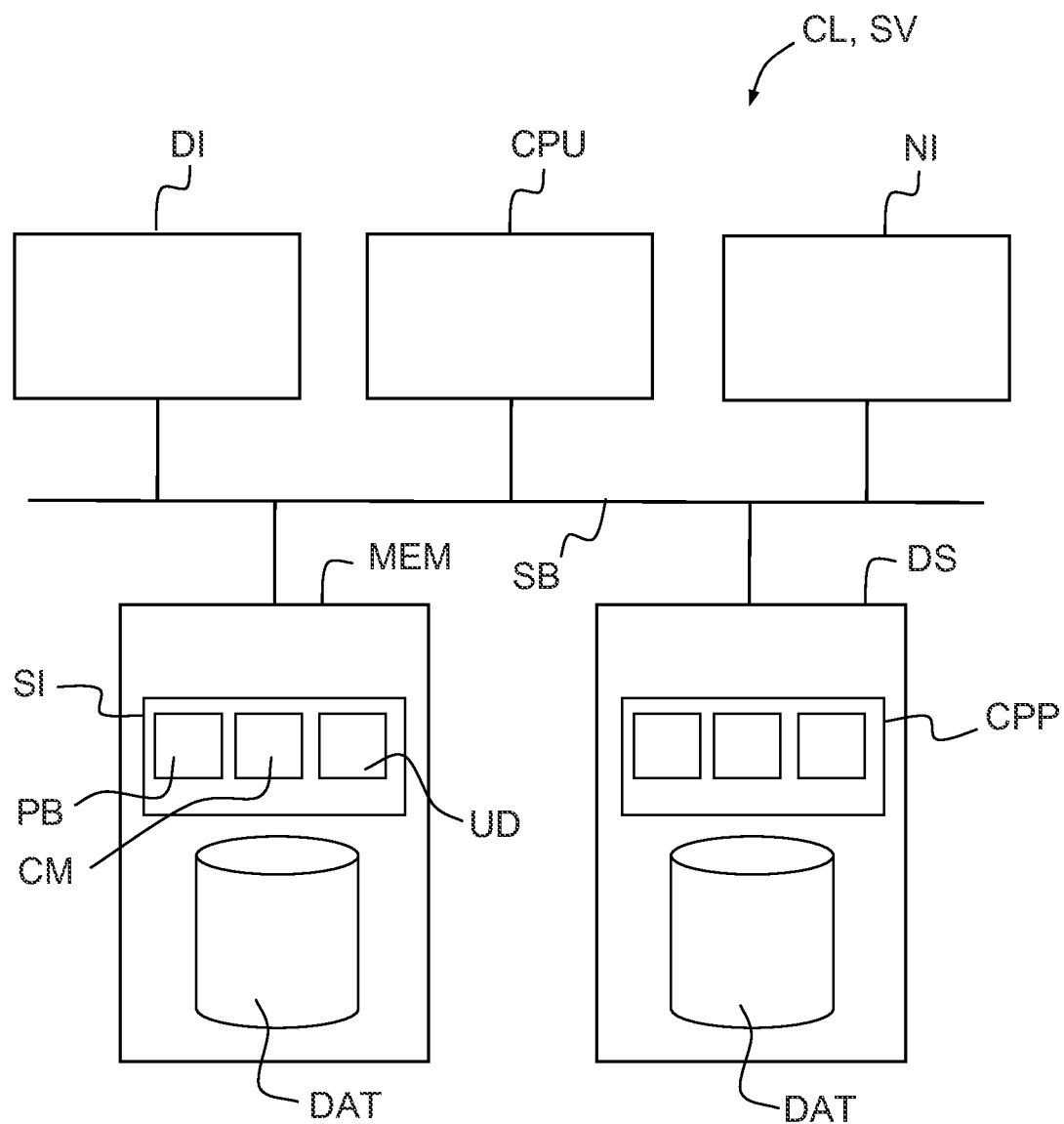
FIG. 22 illustrates a diagram of the internal structure of a computer.

FIG. 22 is a diagram of the internal structure of a computer (e.g., client processor/device CL or server computers SV) in the computer system of FIG. 21. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc. . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 21).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 20, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc. . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for configuring a tool with at least one pointing element on a screen comprising the steps of:
   pointing and activating (S1) a tool by performing an action on a pointing element, said tool comprising a list of customizable parameters; and
   while continuing performing said action on the pointing element:
   providing (S2) a first direction for selecting a customizable parameter of the list;
   providing (S3) a second direction for customizing the selected parameter of the list; and
   defining (S4) series of moves of the pointing element according to first and second direction for configuring the tool.

2. A computer-implemented method of claim 1, wherein said first and second directions are orthogonal.

3. A computer-implemented method of claim 2, wherein said first direction is vertical and said second direction is horizontal.

4. A computer-implemented method of claim 1, wherein said pointing element is a mouse, or a pen or a finger in case of touchscreen.

5. A computer-implemented method of claim 1, wherein said screen is a touch screen or a multi-touch screen.

6. A computer-implemented method of claim 1, wherein said parameter is thickness, opacity, hardness, or intensity of a color.

7. A computer-implemented method of claim 1, wherein said parameter is a parameter with a continuous intensity value.

8. A computer-implemented method of claim 1, wherein said parameter is a parameter with a discrete intensity value.

9. A computer-implemented method of claim 1, wherein the selection and customization of the parameter is displayed above the pointing element.

10. A computer-implemented method of claim 1, wherein the tool is automatically activated at the end of configuring.

11. A non-transitory computer-readable medium comprising:
    a computer memory system; and
    computer-executable instructions embodied in the computer memory system and causing a computer system to configure a tool with at least one pointing element on a screen, including the computer executable instructions causing the computer system to:
    point to and activate (S1) the tool by performing an action on a pointing element, said tool comprising a list of customizable parameters; and
    while continuing performing said action on the pointing element:
    providing (S2) a first direction for selecting a customizable parameter of the list;
    providing (S3) a second direction for customizing the selected parameter of the list; and
    defining (S4) series of moves of the pointing element according to first and second direction for configuring the tool.

12. A computer program product comprising:
    a non-transitory computer readable medium configuring a tool with at least one pointing element on a screen; and
    code means stored on the computer readable medium configuring the tool by performing an action on at least one pointing element on a screen by:
    pointing to and activating (S1) the tool by performing an action on a pointing element, said tool comprising a list of customizable parameters; and
    while continuing performing said action on the pointing element:
    providing (S2) a first direction for selecting a customizable parameter of the list;
    providing (S3) a second direction for customizing the selected parameter of the list; and
    defining (S4) series of moves of the pointing element according to first and second direction for configuring the tool.

13. A computer apparatus comprising:
    a graphical user interface viewable in a screen; and
    a tool displayable in a screen view of the graphical user interface with at least one pointing element on the screen wherein the pointing element points to and activates the tool, and
    wherein the tool comprises a list of customizable parameters, the list configured such that, while continuing performing said action on the pointing element:
    a first direction for selecting a customizable parameter of the list is provided;
    a second direction for customizing the selected parameter of the list is provided; and
    a series of moves of the pointing element according to the provided first and second directions is defined for configuring the tool.

14. A computer apparatus as claimed in claim 13 wherein said first and second directions are orthogonal.

15. A computer apparatus claimed in claim 14 wherein said first direction is vertical and said second direction is horizontal.

16. A computer apparatus as claimed in claim 13 wherein said pointing element is a mouse, or a pen or a finger in case of touchscreen.

17. A computer apparatus as claimed in claim 13 wherein said screen is a touch screen or a multi-touch screen.

18. A computer apparatus as claimed in claim 13 wherein said parameter is thickness, opacity, hardness, or intensity of a color.

19. A computer apparatus as claimed in claim 13 wherein said parameter is a parameter with one of:
    a continuous intensity value, and
    a discrete intensity value.

20. A computer apparatus as claimed in claim 13 wherein the selection and customization of the parameter is displayed above the pointing element in screen views of the graphical user interface.

21. The computer-implemented method of claim 1, wherein the action performed on the pointing element is at least one of a click and a hold.

22. The computer apparatus of claim 13, wherein the action performed on the pointing element is at least one of a click and a hold.

* * * * *